United States Patent
Amano et al.

(10) Patent No.: US 12,204,165 B2
(45) Date of Patent: Jan. 21, 2025

(54) PROJECTION LENS AND PROJECTION DEVICE HAVING A SPACE INTERPOSED BETWEEN A FRAME AND A FIRST LENS

(71) Applicant: FUJIFILM Corporation, Tokyo (JP)

(72) Inventors: Masaru Amano, Saitama (JP); Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 530 days.

(21) Appl. No.: 17/522,499

(22) Filed: Nov. 9, 2021

(65) Prior Publication Data

US 2022/0066179 A1 Mar. 3, 2022

Related U.S. Application Data

(63) Continuation of application No. PCT/JP2020/018043, filed on Apr. 27, 2020.

(30) Foreign Application Priority Data

May 17, 2019 (JP) .................................. 2019-093630

(51) Int. Cl.
*G02B 7/02* (2021.01)
*G02B 3/04* (2006.01)
(Continued)

(52) U.S. Cl.
CPC .............. *G02B 7/021* (2013.01); *G02B 3/04* (2013.01); *G02B 13/16* (2013.01); *G03B 21/142* (2013.01);
(Continued)

(58) Field of Classification Search
CPC ...... G03B 21/14–53; H04N 9/31–3197; G02B 7/02–16
See application file for complete search history.

(56) References Cited

U.S. PATENT DOCUMENTS 7,090,354 B2 * 8/2006 Engle ..................... G02B 17/08
348/836
7,672,064 B2 * 3/2010 Sakaki ............... G02B 27/0018
359/796
(Continued)

FOREIGN PATENT DOCUMENTS

JP 2006-162878 A 6/2006
JP 2007-94242 A 4/2007
(Continued)

OTHER PUBLICATIONS

Japanese Office Action for Japanese Application No. 2021-520681, dated Jul. 26, 2022, with English translation.
(Continued)

*Primary Examiner* — Bao-Luan Q Le
(74) *Attorney, Agent, or Firm* — Birch, Stewart, Kolasch & Birch, LLP (57) ABSTRACT

A projection lens is a projection lens that emits incident light through a plurality of lenses, and includes a first lens that is disposed to be closest to an emission side, a second lens which is adjacent to the first lens and of which a diameter is smaller than a diameter of the first lens, and a frame that includes a first surface and is positioned outside the second lens in a radial direction. The first surface faces the first lens, the first surface has a light reflection-reducing structure, and a value of G1/G2 is 1.7 or more in a case where a diameter of the first lens is denoted by G1 and a diameter of the second lens is denoted by G2.

22 Claims, 6 Drawing Sheets

(51) Int. Cl.
*G02B 13/16* (2006.01)
*G03B 21/14* (2006.01)
*G03B 21/20* (2006.01)
*G02B 3/00* (2006.01)

(52) U.S. Cl.
CPC ....... *G03B 21/145* (2013.01); *G03B 21/2066* (2013.01); *G02B 2003/0093* (2013.01); *G03B 21/2033* (2013.01)

(56) References Cited

U.S. PATENT DOCUMENTS

| | | | | |
|---|---|---|---|---|
| 7,855,847 | B2 * | 12/2010 | Kawasaki | G02B 7/021 359/830 |
| 7,969,667 | B2 * | 6/2011 | Sodeyama | G02B 7/021 359/740 |
| 10,574,935 | B2 * | 2/2020 | Shiokawa | G02B 13/04 |
| 2004/0223123 | A1 * | 11/2004 | Engle | G02B 17/08 353/69 |
| 2007/0076309 | A1 | 4/2007 | Shimizu et al. | |
| 2008/0186592 | A1 * | 8/2008 | Sakaki | G02B 27/0018 359/707 |
| 2009/0225455 | A1 * | 9/2009 | Kawasaki | G02B 13/04 359/830 |
| 2010/0027135 | A1 * | 2/2010 | Sodeyama | G02B 7/021 359/740 |
| 2015/0138649 | A1 | 5/2015 | Kubota | |
| 2017/0363836 | A1 | 12/2017 | Shimizu | |
| 2018/0203336 | A1 | 7/2018 | Kuroda | |
| 2019/0025679 | A1 | 1/2019 | Kuroda | |
| 2019/0166329 | A1 * | 5/2019 | Shiokawa | G02B 13/16 |
| 2019/0219915 | A1 | 7/2019 | Kayano | |

FOREIGN PATENT DOCUMENTS

| | | | |
|---|---|---|---|
| JP | 2013-88897 | A | 5/2013 |
| JP | 2014-59333 | A | 4/2014 |
| JP | 2015-96927 | A | 5/2015 |
| JP | 2017-58410 | A | 3/2017 |
| JP | 2019-2969 | A | 1/2019 |
| JP | 2019002969 | A * | 1/2019 |
| JP | 2019-45869 | A | 3/2019 |
| WO | WO 2016/157975 | A1 | 10/2016 |
| WO | WO 2017/047518 | A1 | 3/2017 |
| WO | WO 2018/055964 | A1 | 3/2018 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/018043, dated Dec. 2, 2021, with an English translation.

International Search Report (Form PCT/ISA/210) for International Application No. PCT/JP2020/018043, dated Jul. 7, 2020, with an English translation.

* cited by examiner

EMISSION SIDE ⟷ INCIDENT SIDE
(ENLARGEMENT SIDE) (REDUCTION SIDE)

| | LENS 16C | | | LENS 16B | | | HALF ANGLE OF VIEW | DIFFERENCE IN DIAMETER | RESULTS |
|---|---|---|---|---|---|---|---|---|---|
| | DIAMETER | TYPE | THICKNESS RATIO | DIAMETER | TYPE | UNEVEN SHAPE | | | GENERATION OF STRAY LIGHT |
| EXPERIMENTAL EXAMPLE 1 | 105 mm | ASPHERICAL | 4 | 50 mm | SPHERICAL | PRESENCE | 70° | 2.1 | C |
| EXPERIMENTAL EXAMPLE 2 | 105 mm | ASPHERICAL | 4 | 50 mm | SPHERICAL | ABSENCE | 70° | 2.1 | A |
| EXPERIMENTAL EXAMPLE 3 | 130 mm | SPHERICAL | 4 | 100 mm | SPHERICAL | ABSENCE | 62.5° | 1.3 | C |
| EXPERIMENTAL EXAMPLE 4 | 120 mm | ASPHERICAL | 2.5 | 75 mm | SPHERICAL | ABSENCE | 65° | 1.6 | B |

PROJECTION LENS AND PROJECTION DEVICE HAVING A SPACE INTERPOSED BETWEEN A FRAME AND A FIRST LENS

CROSS-REFERENCE TO RELATED APPLICATION

This application is a continuation application of International Application No. PCT/JP2020/018043, filed Apr. 27, 2020, the disclosure of which is incorporated herein by reference in its entirety. Further, this application claims priority from Japanese Patent Application No. 2019-093630 filed on May 17, 2019, the disclosure of which is incorporated herein by reference in its entirety.

BACKGROUND

1. Technical Field

The technique of the present disclosure relates to a projection lens and a projection device.

2. Description of the Related Art

JP2006-162878A discloses an optical system of a projection type display device where a reflective optical modulation element is mounted and image information formed by the reflective optical modulation element is projected on a projection surface through a projection lens, and a blocking unit for blocking the projection of unnecessary light passing through a stop of a lens composing the projection lens is provided on an inner wall surface, which is closer to the projection surface than the stop, of a holding member for the lens including the stop.

SUMMARY

An embodiment according to the technique of the disclosure provides a projection lens and a projection device that can suppress the generation of stray light.

According to a first aspect of the technique of the disclosure, a projection lens that emits incident light through a plurality of lenses comprises a first lens that is disposed to be closest to an emission side, a second lens which is adjacent to the first lens and of which a diameter is smaller than a diameter of the first lens, and a frame that includes a first surface and is positioned outside the second lens in a radial direction. The first surface faces the first lens, the first surface has a light reflection-reducing structure, and a value of G1/G2 is 1.7 or more in a case where a diameter of the first lens is denoted by G1 and a diameter of the second lens is denoted by G2.

According to a second aspect of the technique of the disclosure, in the projection lens according to the first aspect, the light reflection-reducing structure is an uneven shape.

According to a third aspect of the technique of the disclosure, a projection lens that emits incident light through a plurality of lenses comprises a first lens that is disposed to be closest to an emission side, a second lens which is adjacent to the first lens and of which a diameter is smaller than a diameter of the first lens, and a frame that includes a first surface and is positioned outside the second lens in a radial direction. The first surface faces the first lens, the first surface has an uneven shape, and a value of G1/G2 is 1.7 or more in a case where a diameter of the first lens is denoted by G1 and a diameter of the second lens is denoted by G2.

According to a fourth aspect of the technique of the disclosure, in the projection lens according to the second or third aspect, the frame includes a flat second surface and a depth of unevenness of the first surface is larger than a depth of unevenness of the second surface.

According to a fifth aspect of the technique of the disclosure, in the projection lens according to any one of the first to fourth aspects, a half angle of view of the projection lens is 63° or more.

According to a sixth aspect of the technique of the disclosure, in the projection lens according to any one of the first to fifth aspects, the first lens is an aspherical lens and the second lens is a spherical lens.

According to a seventh aspect of the technique of the disclosure, in the projection lens according to the sixth aspect, at least an incident-side lens surface of the first lens is an aspherical surface and the lens surface includes both a concave surface portion and a convex surface portion.

According to an eighth aspect of the technique of the disclosure, in the projection lens according to the seventh aspect, a thickness of the convex surface portion of the first lens is 2.6 to 6 times a thickness of the concave surface portion.

According to a ninth aspect of the technique of the disclosure, the projection lens according to any one of the first to eighth aspects further comprises a stop portion and at least two or more lenses are provided between the first surface and the stop portion.

According to a tenth aspect of the technique of the disclosure, the projection lens according to any one of the first to ninth aspects further comprises a reflective mirror that reflects incident light and a stop portion, and the stop portion is closer to an incident side than the reflective mirror and the first surface is closer to the emission side than the reflective mirror.

According to an eleventh aspect of the technique of the disclosure, in the projection lens according to any one of the first to tenth aspects, the frame is made of a resin material and holds the second lens.

According to a twelfth aspect of the technique of the disclosure, in the projection lens according to the eleventh aspect, a distal end of the frame covers a side surface of the second lens and an outer peripheral edge of a surface of the second lens.

According to a thirteenth aspect of the technique of the disclosure, in the projection lens according to any one of the first to twelfth aspects, a center of an image to be projected is biased with respect to an optical axis of the second lens.

According to a fourteenth aspect of the technique of the disclosure, a projection device comprises the projection lens according to any one of the first to thirteenth aspects, a housing on which the projection lens is mounted, and an electro-optical element that is housed in the housing.

BRIEF DESCRIPTION OF THE DRAWINGS

Exemplary embodiments according to the technique of the present disclosure will be described in detail based on the following figures, wherein.

DETAILED DESCRIPTION

An example of an embodiment of a technique of the disclosure will be described below with reference to the drawings.

Terms, such as "first", "second", and "third", used in this specification are added to avoid the confusion of components and do not limit the number of components present in a projection lens. Further, "upper" and "lower" used in this specification mean directions in a drawing unless otherwise specified and do not mean absolute directions.

<Configuration of Projector 10>

Figure 1:
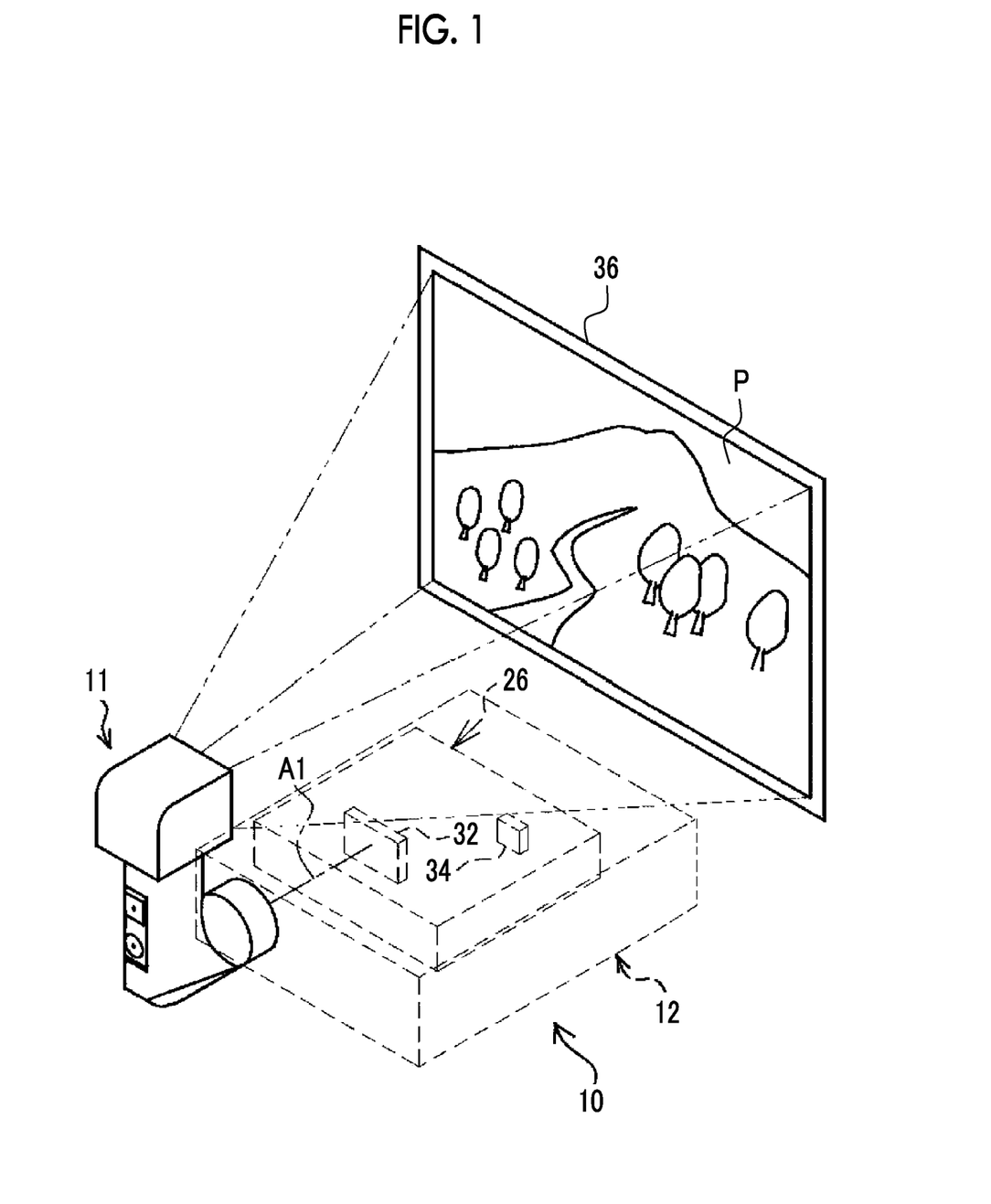
FIG. 1 is a perspective view showing a usage example of a projector including a projection lens according to an embodiment.

A projector 10 is an example of a projection device that projects an image P on a screen 36 as shown in FIG. 1. A projection lens 11 of this embodiment is used in a state where the projection lens 11 is mounted on a body part 12 of a projector 10. The body part 12 corresponds to a housing of the projector 10. The body part 12 houses main components, such as an image forming unit 26 and a control board (not shown). The projection lens 11 may be a type of a projection lens fixed to the body part 12, or may be mounted on the body part 12 so as to be interchangeable with another projection lens.

Luminous flux representing an image formed by the image forming unit 26 is incident on the projection lens 11 from the body part 12 along an optical axis A1. The projection lens 11 enlarges image light, which is based on the incident luminous flux, by an optical system and forms an image. Accordingly, the projection lens 11 projects the enlarged image of the image P, which is formed by the image forming unit 26, on the screen 36 installed outside the projector 10. The image P is an example of "an image to be projected" of Claims.

The image forming unit 26 forms an image to be projected. The image forming unit 26 comprises an image forming panel 32 that is an electro-optical element, a light source 34, a light guide member (not shown), and the like. The light source 34 applies light to the image forming panel 32. The light guide member guides light, which is applied from the light source 34, to the image forming panel 32. The image forming unit 26 is, for example, a reflective type image forming unit that uses a digital mirror device (DMD) as the image forming panel 32. As well known, the DMD is an image display element which includes a plurality of micromirrors capable of changing the reflection direction of light applied from the light source 34 and in which the respective micromirrors are two-dimensionally arranged in pixels. The DMD performs optical modulation corresponding to an image by changing the direction of each micromirror according to the image to switch the ON/OFF of reflected light of light applied from the light source 34.

Examples of the light source 34 include a white light source. The white light source emits white light. The white light source is, for example, a light source that is realized from the combination of a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor.

The image forming unit 26 is further provided with a rotary color filter that selectively converts white light emitted from the light source 34 into each of blue light B (Blue), green light G (Green), and red light R (Red) in a time-sharing manner. Each of blue light B, green light G, and red light R is selectively applied to the image forming panel 32, so that image light where image information about each of blue light B, green light G, and red light R is carried and supported is obtained. Each color image light obtained in this way is selectively incident on the projection lens 11, so that each color image light is projected toward the screen 36. The respective color image lights are integrated with each other on the screen 36, so that a full color image P is displayed on the screen 36.

Figure 2:
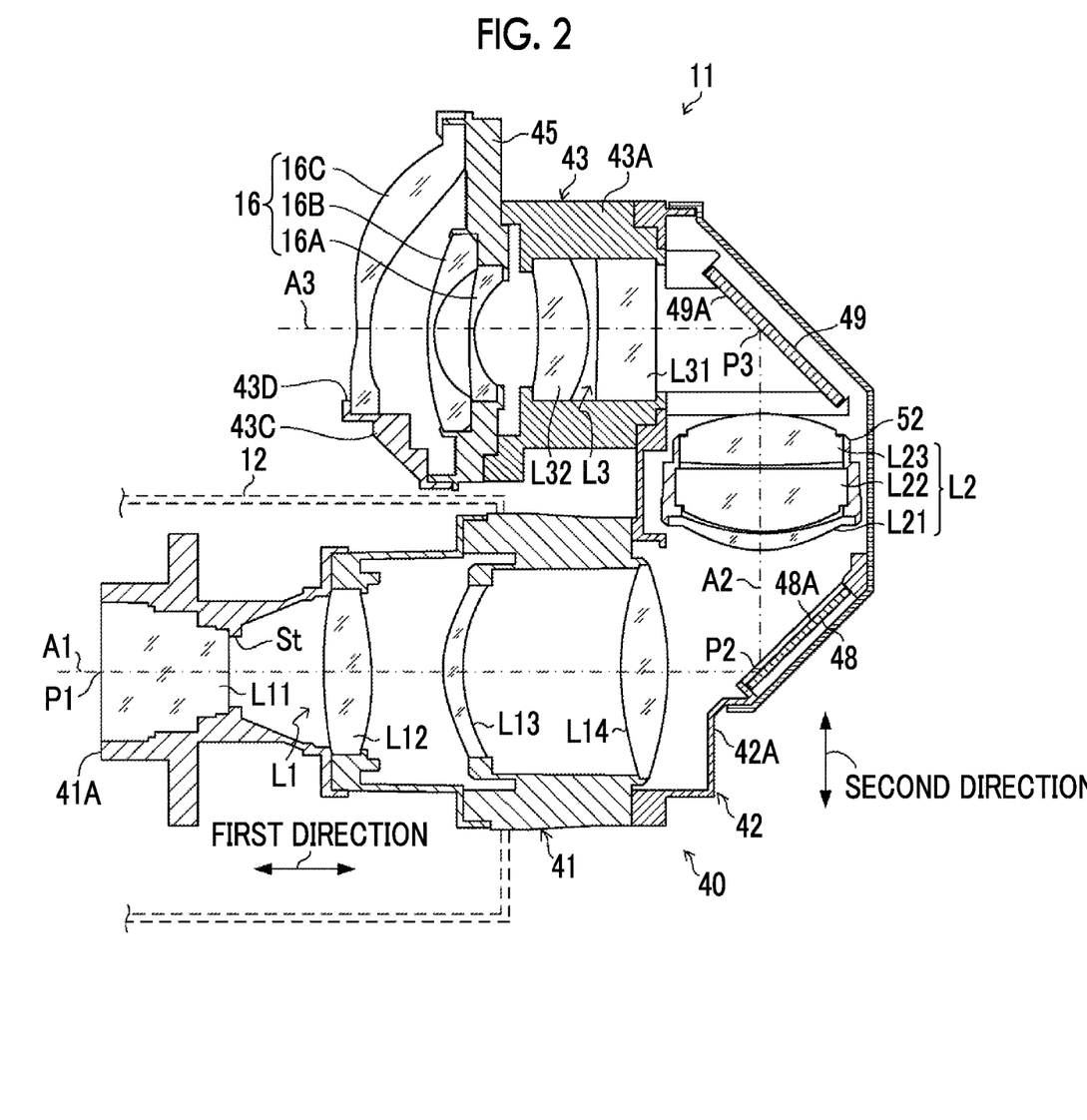
FIG. 2 is a longitudinal sectional view of the projection lens according to this embodiment.

The projection lens 11 comprises a lens barrel 40 shown in FIG. 2. An aspect in which the projection lens 11 includes an exterior cover provided outside the lens barrel 40 is shown in FIG. 1, but an aspect in which the exterior cover is removed from the projection lens 11 is shown in FIG. 2 and the like.

Figure 3:
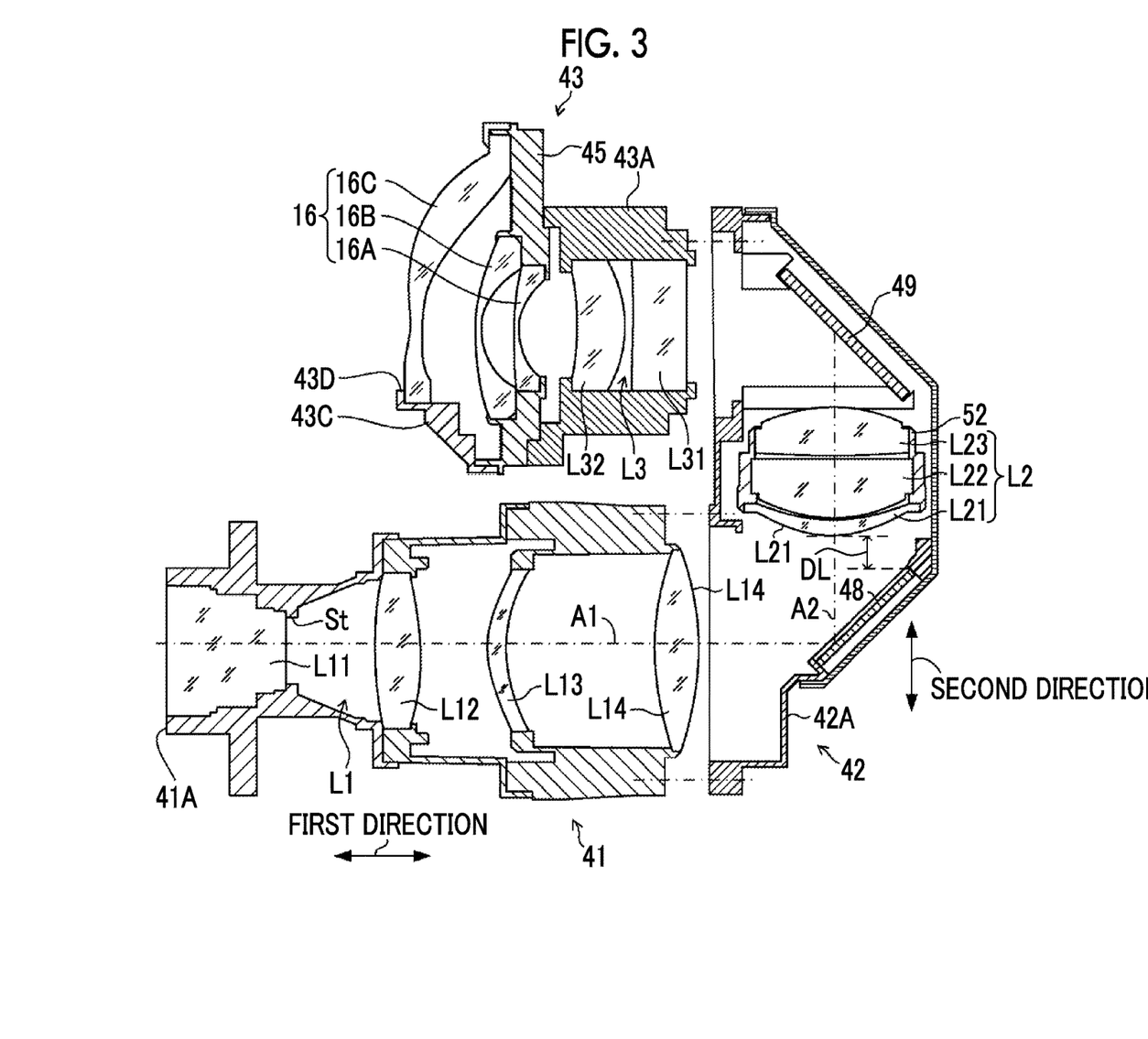
FIG. 3 is a longitudinal sectional view showing that a first lens barrel unit, a second lens barrel unit, and a third lens barrel unit of the projection lens according to this embodiment are separated from each other.

As shown in FIGS. 2 and 3, the projection lens 11 includes a bending optical system for bending an optical axis twice by way of example. The bending optical system has a first optical axis A1, a second optical axis A2, and a third optical axis A3. The second optical axis A2 is an optical axis that is bent at an angle of 90° from the first optical axis A1. The third optical axis A3 is an optical axis that is bent at an angle of 90° from the second optical axis A2. 90° mentioned here is a value that includes an error allowed in design. Further, as shown in FIG. 2, a direction in which the first optical axis A1 extends is referred to as a first direction and a direction in which the second optical axis A2 extends is referred to as a second direction. Since the first optical axis A1 and the third optical axis A3 are parallel to each other in this example, the first direction also coincides with a direction in which the third optical axis A3 extends.

Furthermore, as described above, the projection lens 11 enlarges luminous flux incident from the image forming unit 26 and emits the luminous flux toward the screen 36. In this embodiment, in the projection lens 11, an upstream side in a direction in which light travels, that is, a side close to the image forming unit 26 is referred to as an incident side or a reduction side. In contrast, in the projection lens 11, a side that is a downstream side in a direction in which light travels and is close to the screen 36 is referred to as an emission side or an enlargement side.

The lens barrel 40 houses the bending optical system. The lens barrel 40 comprises a first lens barrel unit 41, a second lens barrel unit 42, and a third lens barrel unit 43. The incident side of the first lens barrel unit 41 is mounted on the body part 12 of the projector 10. The incident side of the second lens barrel unit 42 is connected to the emission side of the first lens barrel unit 41. Further, the incident side of the third lens barrel unit 43 is connected to the emission side of the second lens barrel unit 42.

The first lens barrel unit 41 houses a first optical system L1, which is disposed along the first optical axis A1, therein and holds the first optical system L1. The second lens barrel unit 42 houses a second optical system L2, which is disposed along the second optical axis A2, therein and holds the second optical system L2. The third lens barrel unit 43 houses a third optical system L3, which is disposed along the third optical axis A3, therein and holds the third optical system L3. The central axis of the first lens barrel unit 41 substantially coincides with the first optical axis A1. The central axis of the second lens barrel unit 42 substantially coincides with the second optical axis A2. The central axis of the third lens barrel unit 43 substantially coincides with the third optical axis A3.

In the lens barrel 40, the first lens barrel unit 41 is a lens barrel unit that is positioned to be closest to the incident side, the third lens barrel unit 43 is a lens barrel unit that is positioned to be closest to the emission side, and the second lens barrel unit 42 is a lens barrel unit that is positioned between the first lens barrel unit 41 and the third lens barrel unit 43. Further, the second lens barrel unit 42 houses a first mirror 48 and a second mirror 49 in addition to the second optical system L2, and holds the first mirror 48 and the second mirror 49 in addition to the second optical system L2.

The first optical system L1 is composed of, for example, a lens L11, a lens L12, a lens L13, and a lens L14, and the respective lenses L11 to L14 are arranged in this order from the upstream side, that is, a light incident side. The lens L11 is, for example, a zoom lens group. In the drawings, in order to simplify description, the detailed configuration of the respective lenses L11 to L14 will be omitted and each of the lenses will be represented as one lens. However, each lens may be one lens, or may be composed of a plurality of lenses.

In the second lens barrel unit 42, the first mirror 48, the second optical system L2, and the second mirror 49 are arranged in this order from the incident side. The first mirror 48 is positioned to be closest to the incident side in the second lens barrel unit 42, and is disposed to be close to an emission end of the first lens barrel unit 41. The second mirror 49 is positioned to be closest to the emission side in the second lens barrel unit 42, and is disposed to be close to an incident end of the third lens barrel unit 43.

Further, the first mirror 48 and the second optical system L2 do not overlap with each other in a second direction in which the second optical axis A2 extends. Specifically, as shown in FIG. 3, an upper end of the first mirror 48 in the second direction and a lower end of the second optical system L2 in the second direction are spaced from each other by a distance DL. That is, the first mirror 48 and the second optical system L2 are spaced from each other without overlapping with each other in the second direction.

The first mirror 48 is one of optical elements composing the bending optical system and bends the first optical axis A1 to form the second optical axis A2. The first mirror 48 is a first reflective part that bends light parallel to the first optical axis A1 to form light parallel to the second optical axis A2. A reflective surface 48A of the first mirror 48 is disposed in an attitude where the reflective surface 48A forms an angle of 45° with respect to each of the first optical axis A1 and the second optical axis A2. For example, the first mirror 48 is a specular reflective mirror of which a transparent member, such as glass, is coated with a reflective film.

The second mirror 49 is also one of optical elements composing the bending optical system and is a reflective part that bends an optical axis like the first mirror 48. The second mirror 49 bends the second optical axis A2 to form the third optical axis A3. The second mirror 49 is a second reflective part that bends light parallel to the second optical axis A2 to form light parallel to the third optical axis A3. A reflective surface 49A of the second mirror 49 is disposed in an attitude where the reflective surface 49A forms an angle of 45° with respect to each of the second optical axis A2 and the third optical axis A3. For example, the second mirror 49 is also the same specular reflective mirror as the first mirror 48.

The second optical system L2 is composed of, for example, a lens L21, a lens L22, and a lens L23, and the respective lenses L21 to L23 are arranged in this order from the upstream side, that is, the light incident side. Each of the lenses L21, L22, and L23 may be one lens, or may be a cemented lens.

Further, a distance along the first optical axis A1 between the most upstream lens L11 of the first optical system L1 and the first mirror 48 is longer than a distance along the second optical axis A2 between the first mirror 48 and the second mirror 49. Specifically, as shown in FIG. 2, a point where the first optical axis A1 and the light incident surface of the lens L11 intersect with each other is denoted by P1, a point where the first optical axis A1 and the reflective surface 48A of the first mirror 48 intersect with each other is denoted by P2, and a point where the second optical axis A2 and the reflective surface 49A of the second mirror 49 intersect with each other is denoted by P3. In this case, a distance between P1 and P2 is longer than a distance between P2 and P3. That is, the lens barrel 40 is adapted so that the second lens barrel unit 42 housing the second optical system L2 is more compact than the first lens barrel unit 41 housing the first optical system L1.

The third optical system L3 is an emission optical system and is composed of, for example, a lens L31, a lens L32, and an emission lens group 16, and the lens L31, the lens L32, and the emission lens group 16 are arranged in this order from the upstream side, that is, the light incident side. The lens L31 and the lens L32 compose, for example, a focus lens group. The emission lens group 16 is disposed at an emission-side end part of the third lens barrel unit 43 closest to the emission side. The specific configuration of the emission lens group 16 and the third lens barrel unit 43 will be described later.

As shown in FIG. 3, light emitted from the image forming unit 26 of the body part 12 is incident on an incident-side end part 41A of the first lens barrel unit 41. The first optical system L1 collects incident luminous flux and forms an intermediate image on the front stage of the second optical system L2. Specifically, the first optical system L1 forms an intermediate image near the first mirror 48 on the upstream side of the first mirror 48 provided in the second lens barrel unit 42. The lens L14 is disposed on the most downstream side of the first optical system L1, that is, immediately behind the intermediate image. The diameter of luminous flux emitted from the lens L14 is reduced by the imaging action of the first optical system L1. Since the lens L14 is provided on the upstream of the first mirror 48, the luminous flux of which the diameter is reduced by the lens L14 is incident on the first mirror 48. Accordingly, the first mirror 48 can be made to have a small size. The intermediate image is formed in the second lens barrel unit 42. The intermediate image may be adapted to be formed near the first mirror 48 on the downstream side of the first mirror 48.

Luminous flux reflected by the first mirror 48 is incident on the second optical system L2. The second optical system L2 functions as a relay lens that uses the intermediate image formed by the first optical system L1 as a subject and relays the luminous flux representing the intermediate image to the third optical system L3. The second optical system L2 is composed of, for example, three lenses, that is, the lens L21, the lens L22, and the lens L23. The second optical system L2 causes the luminous flux, which is reflected by the first mirror 48, to be incident on the second mirror 49. The second mirror 49 reflects the luminous flux, which is incident from the second optical system L2, toward the third optical system L3.

The third optical system L3 emits the luminous flux, which is incident from the second mirror 49, toward the screen 36 from the emission lens group 16. Accordingly, light incident on the incident-side end part 41A from the body part 12 is emitted toward the screen 36 from the emission lens group 16, so that the image P is projected on the screen 36.

All of a part of the first lens barrel unit 41, the second lens barrel unit 42, and the third lens barrel unit 43 are made of a resin material. On the other hand, a frame forming the incident-side end part 41A in FIG. 2 is made of a metal material. Since the length of the first optical axis A1 passing through P1 and P2 is longer than the length of the second optical axis A2 passing through P2 and P3, the incident-side end part 41A may be positioned at a position deep in the projector 10 in a case where the projection lens 11 is mounted on the projector 10. In the case of such a position, the incident-side end part 41A is strongly affected by heat generated from the light source 34 (see FIG. 1) provided in the projector 10. Accordingly, it is preferable that the frame forming the incident-side end part 41A is made of a metal material having high heat resistance.

The first lens barrel unit 41 and the third lens barrel unit 43 are formed in the same general tubular shape as a general lens barrel unit. The general tubular shape is specifically a shape of which only an incident side and an emission side, which are both ends of a tubular shape in an axial direction, are open and the cross-sectional shape of an internal cavity orthogonal to the axial direction is a circular shape matching the appearance of a circular lens. The first optical system L1 and the third optical system L3 are held by the first lens barrel unit 41 and the third lens barrel unit 43 having such a general tubular shape, respectively. In a case where the first lens barrel unit 41 and the first optical system L1 are to be assembled with each other, the first optical system L1 is inserted from the incident-side opening or the emission-side opening of the first lens barrel unit 41 in the axial direction of the tubular shape. Likewise, in a case where the third lens barrel unit 43 and the third optical system L3 are to be assembled with each other, the third optical system L3 is inserted from the incident-side opening or the emission-side opening of the third lens barrel unit 43 in the axial direction of the tubular shape.

In contrast, the second lens barrel unit 42 includes a holding frame 42A that has a shape different from the general tubular shape and a lens frame 52 that includes the second optical system L2. Specifically, as shown in FIG. 3, the shape of the holding frame 42A seen from a lateral side is a substantially trapezoidal shape. Further, the holding frame 42A is open on the emission side in the first direction at an upper portion thereof and is open on the incident side in the first direction at a lower portion thereof.

As described above, the projection lens 11 is a projection lens that emits incident light through a plurality of lenses. The configuration of a part of the projection lens 11 will be described more specifically below.

<Specific Configuration of Emission Lens Group 16 of Projection Lens 11>

Figure 4:
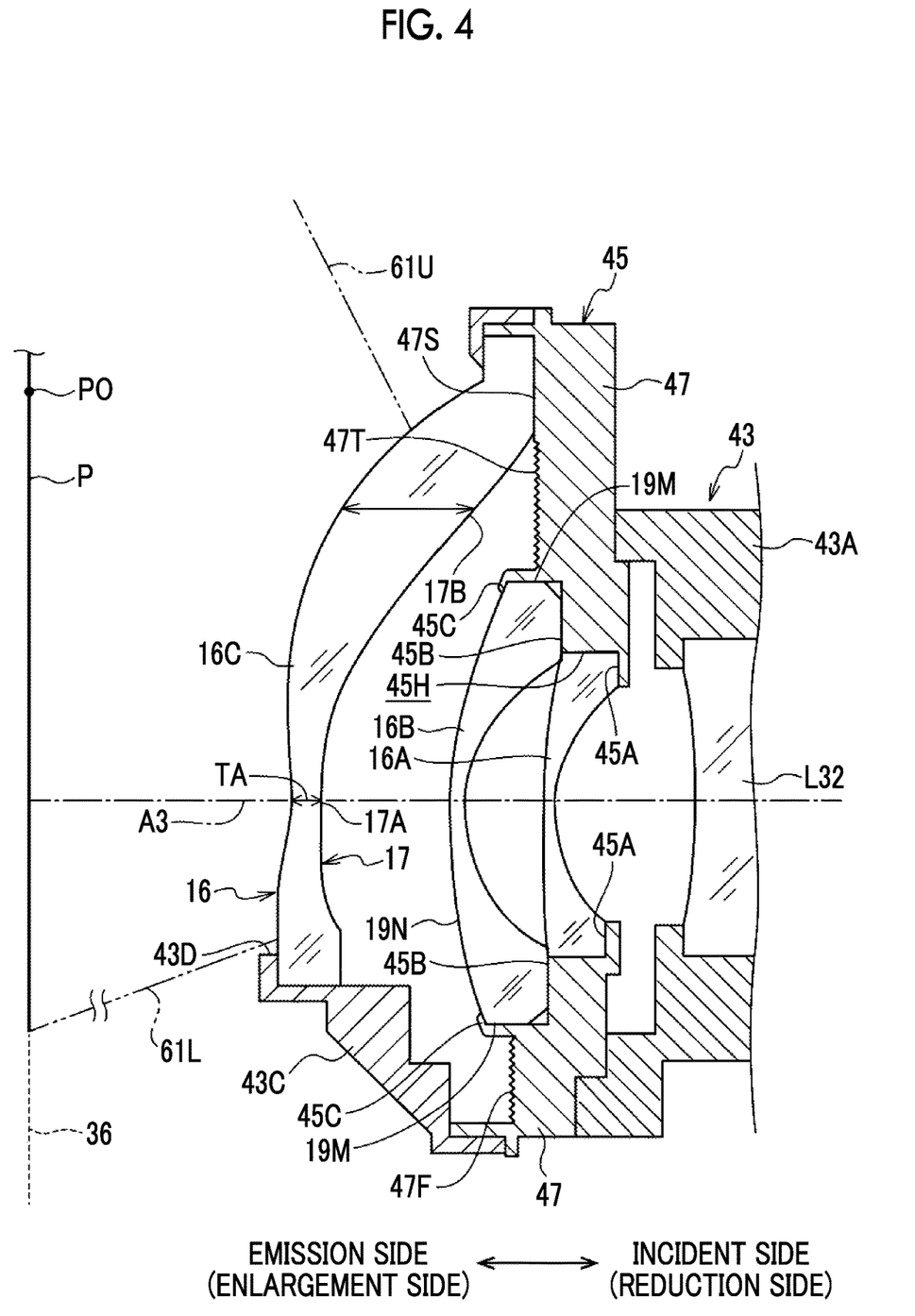
FIG. 4 is a longitudinal sectional view enlarging an emission lens group and the third lens barrel unit of the projection lens according to this embodiment.

As shown in FIGS. 3 and 4, the emission lens group 16 of the projection lens 11 includes a lens 16A, a lens 16B, and a lens 16C. The lens 16C is an example of "first lens" of Claims. The lens 16B is an example of "second lens" of Claims.

The lens 16C is disposed to be closest to the emission side (enlargement side) in the emission lens group 16. Since the emission lens group 16 is disposed to be closest to the emission side in the projection lens 11, the lens 16C is a lens that is disposed to be closest to the emission side among the plurality of lenses included in the projection lens 11.

The lens 16B is adjacent to the lens 16C. That is, the lens 16B is disposed to be closest to the emission side next to the lens 16C among the plurality of lenses included in the projection lens 11. In other words, the lens 16B is disposed to be closest to the emission side except for the lens 16C among the plurality of lenses included in the projection lens 11.

The lens 16A is adjacent to the lens 16B on the light incident side of the lens 16B. Accordingly, in the emission lens group 16, the lens 16A, the lens 16B, and the lens 16C are arranged on the third optical axis A3 in this order from the incident side toward the emission side.

Each of the lens 16A and the lens 16B is a spherical lens of which the lens surface is spherical, and causes luminous flux to diverge since having negative optical power in order to enlarge an image to be projected. Each of the lens 16A and the lens 16B of this example is a meniscus lens having negative optical power, and two lens surfaces thereof, that is, an emission-side lens surface and an incident-side lens surface are convex toward the emission side.

As shown in FIG. 4, a center PO of the image P to be projected on the screen 36 from the lens 16C is biased with respect to the third optical axis A3 that is the optical axis of the lens 16B. In FIG. 4, the range of luminous flux emitted from the lens 16C is schematically shown by an upper ray 61U shown above the third optical axis A3 and a lower ray 61L shown below the third optical axis A3. In a case where the projection lens 11 is seen from the lateral side, the upper ray 61U and the lower ray 61L are not symmetric with respect to the third optical axis A3 as shown in FIG. 4. Specifically, an angle between the upper ray 61U and the third optical axis A3 is larger than an angle between the lower ray 61L and the third optical axis A3. Accordingly, the center PO of the image P to be projected on the screen 36 is biased upward in FIG. 4 with respect to the third optical axis A3. For example, the center of the image forming panel 32 is disposed to be biased with respect to the first optical axis A1 of the projection lens 11, so that configuration as in this example is realized.

The half angle of view of the projection lens 11 of this example is 63° or more and is more preferably 65° or more. In order to ensure a large angle of view, the lens 16A and the lens 16B require high optical power. In order to ensure high optical power, a glass lens is preferable to a plastic lens. Further, since the weight of a lens to be used is increased in a case where the diameter of the lens to be used is increased, it is preferable that the diameter of the lens to be used is small. Accordingly, a glass lens is used as each of the lens 16A and the lens 16B so that high optical power can be ensured while an increase in the diameter of a lens is suppressed. Therefore, the angle of view of an image to be projected can be increased in a state where the relatively small diameter of a lens is maintained. Further, the cross-sectional shape of each of the lens 16A and the lens 16B orthogonal to the third optical axis A3 is a circular shape.

On the other hand, the lens 16C is an aspherical lens having an aspherical lens surface. The lens 16C is mainly in charge of an aberration correction function in the emission lens group 16. As described above, each of the lens 16A and the lens 16B has high optical power to realize a large angle of view while maintaining a small diameter. In general, as optical power is increased, a field curvature and distortion are increased. The aberration correction ability of an aspherical lens is higher than that of a spherical lens. For this reason, an aspherical lens is used as the lens 16C of this example. Further, since it is difficult to manufacture an aspherical lens with glass, the lens 16C is a plastic lens.

More specifically, as shown in FIG. 4, all of two lens surfaces of the lens 16C of this example, that is, an emission-side lens surface and an incident-side lens surface are aspherical surfaces. Since an incident-side lens surface 17 of the lens 16C is an aspherical surface, the incident-side lens surface 17 of the lens 16C includes both a concave surface portion 17A and a convex surface portion 17B. The concave surface portion 17A is a portion of the lens surface 17 that is concave toward the emission side (enlargement side) and is a portion of the lens 16C that includes a portion having the smallest thickness in a direction of the optical axis. The convex surface portion 17B is a portion of the lens surface 17 that is convex toward the incident side (reduction side) and is a portion of the lens 16C that includes a portion having the largest thickness in the direction of the optical axis.

Further, in this embodiment, with regard to the thickness of the lens 16C, the thickness TB of the convex surface portion 17B is 2.6 to 6 times the thickness TA of the concave surface portion 17A. More specifically, the thickness TB of the convex surface portion 17B is the maximum value of the thickness of the convex surface portion 17B, and the thickness TA of the concave surface portion 17A is the minimum value of the thickness of the concave surface portion 17C. Since the thickness TB is set to be in the range of 2.6 to 6 times the thickness TA, it is easy to appropriately correct aberration. In the following description, a value (TB/TA) of the thickness TA with respect to the thickness TB will be referred to as a thickness ratio. That is, the thickness ratio (TB/TA) is 2.6 in a case where the thickness TB is 2.6 times the thickness TA, and the thickness ratio (TB/TA) is 6 in a case where the thickness TB is 6 times the thickness TA. Since the aspherical shape of an aspherical lens tends to be complicated in order to appropriately correct a field curvature and distortion, a change in the thickness of each of the convex surface portion 17B and the concave surface portion 17A tends to increase.

Further, in the lens surface 17, the convex surface portion 17B having a relatively large thickness is positioned outside the concave surface portion 17A in a radial direction and the convex surface portion 17B faces a lens facing surface 47T to be described later.

Furthermore, the cross-sectional shape of the lens 16C taken in a direction orthogonal to the third optical axis A3 is not a circular shape unlike the lens 16A and the lens 16B, and the lens 16C is a half-cut lens of which a part positioned below the third optical axis A3 in FIG. 4 is cut and the cross-sectional shape is a substantially semicircular shape (see FIG. 5). There are also many cases where a part of the lens surface of the projection lens 11 used for the projector 10 is used without the use of the entire circumference (that is, a range having a central angle of 360°) of the lens surface thereof centered on the optical axis. The lens 16C of this example is a half-cut lens having a fan-shaped lens surface of which the central angle is in the range equal to or larger than 180° and smaller than 360°.

Further, the diameter of the lens 16B is smaller than the diameter of the lens 16C. That is, the diameter of the lens 16C disposed on the emission side is larger than the diameter of the lens 16B. Specifically, in a case where the diameter of the lens 16C is denoted by G1 and the diameter of the lens 16B is denoted by G2, a value of G1/G2 (hereinafter, it may be referred to as a difference in diameter of the lens 16C with respect to the lens 16B) is 1.7 or more. Furthermore, the value of G1/G2 is 3 or less.

As described above, the lens 16B has high negative optical power to realize a large angle of view while maintaining a small diameter. The lens 16C is in charge of correcting aberration of luminous flux diverging from the lens 16B having a small diameter. For this reason, a difference in diameter of the lens 16C with respect to the lens 16B is increased in the projection lens 11.

The diameter of the lens 16A is smaller than the diameter of the lens 16B. Accordingly, the lens 16A, the lens 16B, and the lens 16C are increased in diameter in this order in the emission lens group 16.

"Diameter" mentioned here is an outer diameter that is a length to the position of the circumferential end surface (so-called edge surface) of a lens. The diameter of a lens is, for example, a diameter. The diameter of the lens 16C, which is a half-cut lens, means the diameter of the lens in a case where it is supposed that the lens is not half cut and has a lens surface of which the central angle is 360°. "Diameter" may be perceived as the radius of a lens, and the above-mentioned difference in diameter has the same value even in a case where "diameter" is perceived as the radius of a lens.

<Specific Configuration of Third Lens Barrel Unit 43 of Projection Lens 11>

As shown in FIGS. 3 and 4, the third lens barrel unit 43 of the projection lens 11 includes a body part 43A, a first holding frame 45, and a second holding frame 43C. The third lens barrel unit 43 including the body part 43A, the first holding frame 45, and the second holding frame 43C are made of a resin material as described above. The first holding frame 45 is an example of "frame" of Claims.

As shown in FIG. 3, the body part 43A is formed in a substantially tubular shape that is open at both ends thereof in an axial direction. The body part 43A holds the lens L31 and the lens L32 that are housed in the body part 43A.

As shown in FIG. 4, the thickness of the first holding frame 45 in the axial direction is smaller than the thickness of the body part 43A in the axial direction and the first holding frame 45 is formed in a substantially discoid shape. The first holding frame 45 includes a circular hole 45H that is provided at a central portion including a center through which the third optical axis A3 passes and used to hold the lens 16A and the lens 16B.

The first holding frame 45 is mounted on the body part 43A on the emission side of the body part 43A. In addition, the first holding frame 45 protrudes outward in the radial direction from the body part 43A.

The inner diameter of the circular hole 45H is increased in stages toward the emission side (enlargement side). Accordingly, the first holding frame 45 includes a contact surface 45A that is in contact with the outer peripheral edge portion of the lens 16A housed in the circular hole 45H and functions as an abutment surface for the lens 16A, and a contact surface 45B that is in contact with the outer peripheral edge portion of the lens 16B housed in the circular hole 45H and functions as an abutment surface for the lens 16B.

The lens 16A abuts on the contact surface 45A, so that the lens 16A is positioned in the direction of the third optical axis A3. The lens 16B abuts on the contact surface 45B, so that the lens 16B is positioned in the direction of the third optical axis A3.

A caulking portion 45C is formed in the circumferential direction of the circular hole 45H at an emission-side edge portion of the circular hole 45H of the first holding frame 45.

The emission-side edge portion of the circular hole 45H is deformed inward in the radial direction of the circular hole 45H by thermal caulking, so that the caulking portion 45C is formed. Specifically, the caulking portion 45C covers the outer peripheral edge of an emission-side lens surface 19N from a circumferential end surface 19M (also referred to as an edge surface or the like) of the lens 16B. Accordingly, the lens 16B is held on the first holding frame 45 by the caulking portion 45C. There are also methods of fixing a lens surface by a separate metal frame (a so-called pressing ring) and the like other than a thermal caulking structure. However, since the thickness of the caulking portion 45C in the direction of the third optical axis is small in comparison with other methods, the caulking portion 45C does not block light emitted from the lens 16B. Therefore, since the diameter of the lens 16B does not need to be large excessively in a case where the lens 16B is to be fixed to the first holding frame 45 by the caulking portion 45C, the diameter of the lens 16B is reduced.

The caulking portion 45C is an example of "a distal end of a frame" of Claims. The end surface 19M of the lens 16B is a surface formed in the circumferential direction of the lens 16B (a direction around the third optical axis), and is an example of "side surface" of Claims. The emission-side lens surface 19N is an example of "surface" of Claims.

The second holding frame 43C holds the lens 16C. The second holding frame 43C is mounted on the first holding frame 45 on the emission side of the first holding frame 45. In addition, the second holding frame 43C includes an opening 43D through which light parallel to the third optical axis passes.

Here, the first holding frame 45 includes a flange portion 47 that protrudes outward in the radial direction of the lens 16B. As shown in FIG. 5, the appearance of the flange portion 47 is not a perfect circular shape, and the amount of protrusion of the lens 16C in the radial direction is partially reduced so as to correspond to the shape of the lens 16C that is a half-cut lens. Specifically, the amount of protrusion of a portion (a portion where the lens 16C is cut) of the flange portion 47 not facing the lens 16C is smaller than the amount of protrusion of a portion of the flange portion 47 facing the lens 16C. FIG. 5 is a diagram of the first holding frame 45, the lens 16B, and the lens 16C as seen from the emission side, and is a diagram schematically showing the first holding frame 45, the lens 16B, and the lens 16C.

Figure 5:
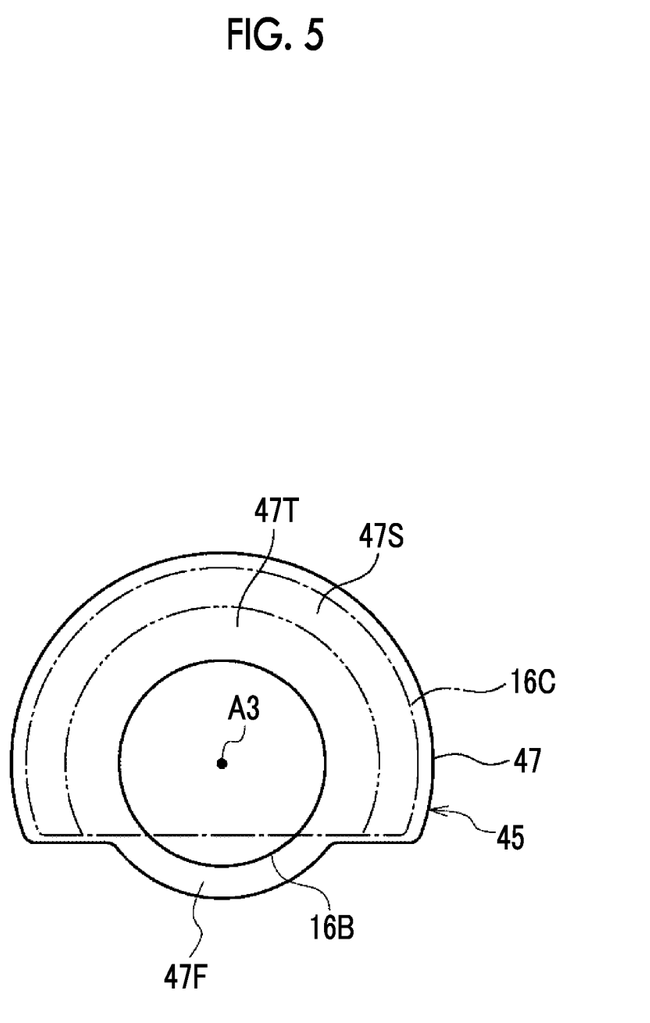
FIG. 5 is a schematic diagram of a part of the emission lens group and a holding frame of the projection lens according to this embodiment as seen from an emission side.

As shown in FIGS. 4 and 5, the flange portion 47 includes a lens facing surface 47T, a lens contact surface 47S, and a frame facing surface 47F. The lens facing surface 47T is a portion of the flange portion 47 of which the amount of protrusion is relatively large, and the frame facing surface 47F is a portion of the flange portion 47 of which the amount of protrusion is relatively small. The lens facing surface 47T is an example of "first surface" of Claims. The lens contact surface 47S is an example of "second surface" of Claims. The lens facing surface 47T, the lens contact surface 47S, and the frame facing surface 47F are surfaces facing in an emission direction (enlargement side).

The lens contact surface 47S functions as an abutment surface for the lens 16C since the lens 16C is in contact with the lens contact surface 47S. The lens facing surface 47T is a surface that is disposed with a gap interposed between the lens 16C and itself and faces the lens 16C in the direction of the optical axis. The frame facing surface 47F is a surface that is disposed with a gap interposed between the second holding frame 43C and itself and faces the second holding frame 43C in the direction of the optical axis.

Since the lens contact surface 47S is a surface with which the lens 16C is to be in contact, the lens contact surface 47S is formed of a flat surface without unevenness. In contrast, each of the lens facing surface 47T and the frame facing surface 47F has an uneven shape where unevenness is formed on a surface. Unevenness is formed by, for example, embossing.

In a case where the lens contact surface 47S is observed microscopically even if the lens contact surface 47S is flat, slight unevenness is formed. However, this unevenness is not unevenness formed by intentional machining. In contrast, unevenness formed on the lens facing surface 47T and the frame facing surface 47F means intentional unevenness formed by machining. Further, the depth of the unevenness of each of the lens facing surface 47T and the frame facing surface 47F is larger than the depth of the slight unevenness formed on the flat lens contact surface 47S.

The depth of unevenness is a dimension between the apex of a convex portion and the bottom of a concave portion. In this embodiment, the depth of unevenness may be an average value of a plurality of depths of unevenness or may be the maximum value of a plurality of depths of unevenness. With regard to theses values, values corresponding to the lens facing surface 47T and the frame facing surface 47F may be larger than a value corresponding to the lens contact surface 47S. The depths of unevenness of the lens facing surface 47T and the frame facing surface 47F are substantially equal to each other.

A surface may be roughened by grinding using, for example, a file, so that unevenness may be formed. Further, a plurality of grooves may be formed at regular intervals using a mold used to mold the first holding frame 45, so that unevenness may be formed. An uneven shape formed on the lens facing surface 47T is an example of "light reflection-reducing structure" of Claims. Since reflected light is reduced in a case where a surface on which light is incident is not flat, "light reflection-reducing structure" is not limited to the above-mentioned example.

<Positional Relationship Between Stationary Stop St and Light Reflection-Reducing Structure of Projection Lens 11>

As shown in FIG. 2, a stationary stop St is provided between the lens L11 and the lens L12 in the first lens barrel unit 41. The stationary stop St narrows luminous flux incident from the body part 12. The stationary stop St is an example of "stop portion" of Claims. At least two or more lenses are arranged between the stationary stop St and the lens facing surface 47T on which an uneven shape as a light reflection-reducing structure is formed. Specifically, in this embodiment, ten lenses, that is, the lens L12, the lens L13, the lens L14, the lens L21, the lens L22, the lens L23, the lens L31, the lens L32, the lens 16A, and the lens 16B are arranged between the stationary stop St and the lens facing surface 47T.

Further, the stationary stop St is disposed to be closer to the incident side than the first and second mirrors 48 and 49 that reflect incident light. On the other hand, the lens facing surface 47T on which an uneven shape as the light reflection-reducing structure is formed is disposed to be closer to the emission side than the first and second mirrors 48 and 49. That is, the first and second mirrors 48 and 49 are arranged between the stationary stop St and the lens facing surface 47T on which an uneven shape as the light reflection-reducing structure is formed. The first and second mirrors 48 and 49 are an example of "reflective mirror" of Claims.

Effects of this Embodiment

Next, the effects of this embodiment will be described.

In a case where the image P is projected on the screen 36 using the projector 10, image light emitted from the image forming unit 26 is incident on the projection lens 11. The luminous flux of the image light incident on the projection lens 11 passes through the first optical system L1 and the second optical system L2 and is incident on the third optical system L3. In the third optical system L3, the incident luminous flux is enlarged by the lens 16A and the lens 16B. Luminous flux emitted from the lens 16B passes through the lens 16C and is emitted toward the screen 36. Accordingly, the image P is projected on the screen 36.

In this case, a part of luminous flux, which is emitted from the lens 16B and is incident on the lens 16C, forms return light, which travels toward the incident side, due to Fresnel reflection on the lens surface of the lens 16C. This return light is reflected by the lens facing surface 47T and the frame facing surface 47F, and reflected return light forms stray light, which causes noise components in the image P, in a case where the reflected return light is concentrated locally.

In particular, as shown in FIG. 4, the center PO of the image P projected on the screen 36 from the lens 16C is biased upward in side view with respect to the third optical axis A3 that is the optical axis of the lens 16B. For this reason, since the incidence angle of a ray incident on the lens 16C also tends to increase on the upper side, the amount of return light reflected by the lens 16C is also likely to be increased in a case where the incidence angle is increased. Accordingly, light forming stray light is likely to be generated.

In the projection lens 11, the lens facing surface 47T has an uneven shape as an example of the light reflection-reducing structure. Accordingly, return light reflected by the lens facing surface 47T is scattered much in comparison with a case where the light reflection-reducing structure, such as an uneven shape, is not provided. Since reflected return light is dispersed without being concentrated locally in a case where return light is scattered much, the generation of stray light is suppressed.

As the area of the lens facing surface 47T is increased, the amount of stray light is increased. In the projection lens 11, as described above, for the reason of ensuring a large angle of view and the like, the diameter of the lens 16C is larger than the diameter of the lens 16B and a difference in diameter of the lens 16C with respect to the lens 16B, specifically, a value (G1/G2) of the diameter (G1) of the lens 16C with respect to the diameter (G2) of the lens 16B is 1.7 or more. For this reason, the area of the lens facing surface 47T with respect to the lens 16B is also relatively large and it is also highly necessary to take measures to suppress the generation of stray light caused by the lens facing surface 47T. The technique of the disclosure is effective in the projection lens 11 having such a difference in diameter.

In the projection lens 11, not only the lens facing surface 47T but also the frame facing surface 47F has an uneven shape as an example of the light reflection-reducing structure. Since return light reflected from the lens 16C is incident even on the frame facing surface 47F, an effect of suppressing stray light caused by the light reflection-reducing structure can be expected.

Further, since an aspherical lens is used in this embodiment as the lens 16C that is mainly in charge of an aberration correction function, correction power for correcting aberration, such as a field curvature and distortion, is high. As a result, even in a case where the diameter of the lens 16B adjacent to the lens 16C is set to be small for the purpose of reducing the size and weight of the projection lens 11, aberration can be appropriately corrected. In particular, in a case where a glass lens is used as the lens 16B, it is highly necessary to reduce the diameter of the lens 16B for a reduction in size and weight. Further, since it is difficult to make a glass lens into an aspherical lens, a glass lens cannot but be made into a spherical lens. Since aberration is more likely generated on a spherical lens as compared to an aspherical lens, there are many cases where aberration needs to be appropriately corrected in a subsequent stage. In a case where the lens 16B, which is an example of the second lens, is a spherical lens as described above, it is effective to use an aspherical lens as the lens 16C that is an example of the first lens.

Further, in this embodiment, an aspherical lens of which the thickness ratio (TB/TA) is 2.6 to 6 is used as the lens 16C in order to appropriately correct aberration. As the thickness ratio is larger, the amount of return light, which is reflected by the lens surface 17 of the lens 16C and travels toward the lens facing surface 47T, also tends to increase. For this reason, in a case where the thickness ratio of the lens 16C is 2.6 to 6 as in this embodiment, the light reflection-reducing structure according to the technique of the disclosure is particularly useful.

Furthermore, the convex surface portion 17B having a relatively large thickness is disposed outside the concave surface portion 17A in the radial direction and faces the lens facing surface 47T. Since the convex surface portion 17B is convex toward the lens facing surface 47T, the lens surface 17 and the lens facing surface 47T are close to each other in a case where the lens facing surface 47T and the convex surface portion 17B face each other in comparison with a case where the lens facing surface 47T and the concave surface portion 17A face each other. In this case, the amount of return light traveling toward the lens facing surface 47T from the lens surface 17 also tends to increase. In such a case, the light reflection-reducing structure according to the technique of the disclosure is particularly useful.

Further, in this embodiment, at least two or more lenses are arranged between the stationary stop St and the lens facing surface 47T on which an uneven shape as the light reflection-reducing structure is formed. Furthermore, in this embodiment, the first and second mirrors 48 and 49 are arranged between the stationary stop St and the lens facing surface 47T on which an uneven shape as the light reflection-reducing structure is formed. JP2006-162878A as the related art discloses a light reflection-reducing structure for light having passed through a lens positioned immediately behind a stop portion, but the technique of the disclosure can suppress the generation of stray light generated regardless of the stationary stop St as described above.

Moreover, in this embodiment, the caulking portion 45C covers the outer peripheral edge of the emission-side lens surface 19N from the end surface 19M of the lens 16B. Accordingly, the lens 16B is held on the first holding frame 45 by the caulking portion 45C. For this reason, the lens 16B can be held without the use of a pressing ring.

EXPERIMENTAL EXAMPLE

Next, experimental examples performed to confirm the effects of this embodiment will be described with reference to a table of FIG. 6. In the experimental examples, the generation of stray light was evaluated while the configuration of the lens 16B, the lens 16C, and the third lens barrel unit 43 was changed in the projection lens 11 of the projector 10.

Experimental Example 1

Figure 6:
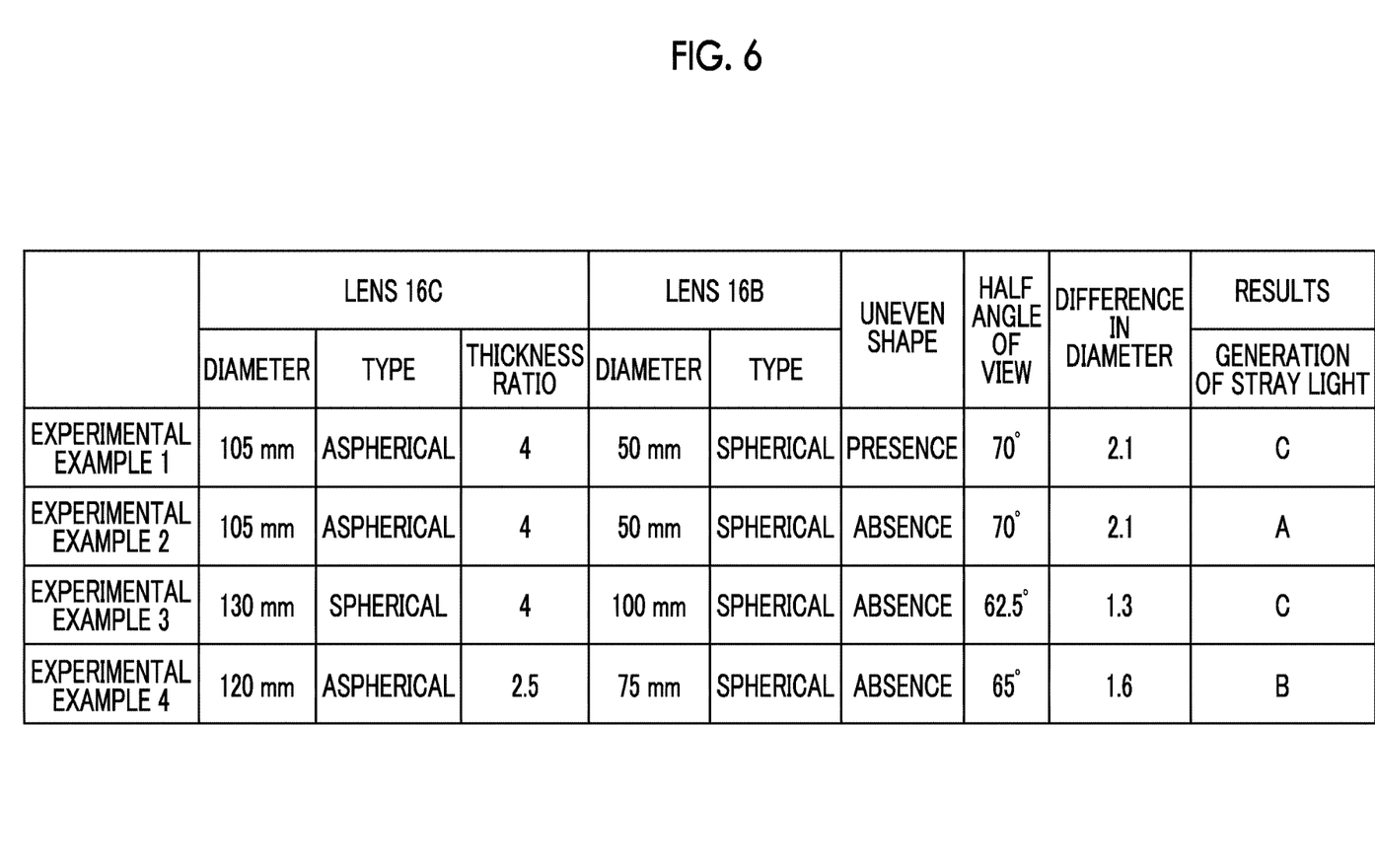
FIG. 6 is a table showing evaluation results of Experimental examples.

In Experimental example 1, an aspherical lens of which the diameter (G1) was 105 mm and the thickness ratio was 4 was used as the lens 16C as shown in FIG. 6. Further, in Experimental example 1, a spherical lens of which the diameter (G2) was 50 mm was used as the lens 16B. Furthermore, a third lens barrel unit 43 where an uneven shape was formed on the lens facing surface 47T and the frame facing surface 47F was used in Experimental example 1. In Experimental example 1, a half angle of view is 70° and a difference in diameter (G1/G2) of the lens 16C with respect to the lens 16B is 2.1. A thickness ratio shown in FIG. 6 is a ratio (TB/TA) of the thickness TB of the convex surface portion 17B to the thickness TA of the concave surface portion 17A of the lens 16C as described above (see FIG. 4).

Experimental Example 2

In Experimental example 2, an aspherical lens of which the diameter was 105 mm and the thickness ratio was 4 was used as the lens 16C as in Experimental example 1. Further, in Experimental example 2, a spherical lens of which the diameter was 50 mm was used as the lens 16B as in Experimental example 1. Furthermore, a third lens barrel unit 43 where an uneven shape was not formed on the lens facing surface 47T and the frame facing surface 47F was used in Experimental example 2. In Experimental example 2, a half angle of view is 70° and a difference in diameter (G1/G2) of the lens 16C with respect to the lens 16B is 2.1 as in Experimental example 1. A difference between Experimental example 1 and Experimental example 2 is only whether or not an uneven shape is present.

Experimental Example 3

In Experimental example 3, a spherical lens of which the diameter was 130 mm and the thickness ratio was 4 was used as the lens 16C. Further, in Experimental example 3, a spherical lens of which the diameter was 100 mm was used as the lens 16B. Furthermore, a third lens barrel unit 43 where an uneven shape was not formed on the lens facing surface 47T and the frame facing surface 47F was used in Experimental example 3. In Experimental example 3, a half angle of view is 62.5° and a difference in diameter (G1/G2) of the lens 16C with respect to the lens 16B is 1.3.

Experimental Example 4

In Experimental example 4, an aspherical lens of which the diameter was 120 mm and the thickness ratio was 2.5 was used as the lens 16C. Further, in Experimental example 4, a spherical lens of which the diameter was 75 mm was used as the lens 16B. Furthermore, a third lens barrel unit 43 where an uneven shape was not formed on the lens facing surface 47T and the frame facing surface 47F was used in Experimental example 4. In Experimental example 4, a half angle of view is 65° and a difference in diameter (G1/G2) is 1.6.

[Evaluation Criteria for Stray Light]

The generation of stray light was evaluated on the basis of the following criteria.
A: Clear stray light was seen.
B: Stray light was seen slightly, but there is no problem in use.
C: Stray light was not seen.

Results of Experiments

As clear from the comparison of Experimental example 1 and Experimental example 2, stray light is clearly seen in Experimental example 2 not having an uneven shape (Evaluation A) but stray light is not seen in Experimental example 1 having an uneven shape (Evaluation C) under a condition where a half angle of view is 70° equal to or larger than 63° and a difference in diameter (G1/G2) of the lens 16C with respect to the lens 16B is 2.1 equal to or larger than 1.7. Further, in Experimental example 3, a half angle of view is 62.5° smaller than 63°, a difference in diameter (G1/G2) of the lens 16C with respect to the lens 16B is 1.3 smaller than 1.7, and stray light is not seen (Evaluation C). However, in Experimental example 3, a half angle of view is relatively small and a difference in diameter (G1/G2) of the lens 16C with respect to the lens 16B is also small. Accordingly, the area of the lens facing surface 47T, which is a cause of generation of stray light, is also small. It is presumed that stray light does not have been generated in Experimental example 3. For this reason, the necessity of the uneven shape according to the technique of the disclosure is low in Experimental example 3 that is outside the scope of the technique of the disclosure.

In Experimental example 4, a half angle of view is 65° which is equal to or larger than 63° but a difference in diameter (G1/G2) of the lens 16C with respect to the lens 16B is 1.6 and is smaller than 1.7. In Experimental example 4, stray light was seen slightly but there was no problem in the use of the device (Evaluation B). It is presumed that the reason for this is that the amount of generated stray light was small since a difference in diameter (G1/G2) was smaller than 1.7 and the area of the lens facing surface 47T was also relatively small. The necessity of the uneven shape according to the technique of the disclosure is low in a case where a difference in diameter (G1/G2) is smaller than 1.7 as described above.

It is found from the results of Experimental examples 2, 3, and 4 that stray light is generated in a case where a difference in diameter (G1/G2) of the lens 16C with respect to the lens 16B is increased. Further, it is presumed from the results of Experimental examples 2 and 4 that stray light is generated and there is a problem in the use of the device in a case where a difference in diameter (G1/G2) of the lens 16C with respect to the lens 16B exceeds 1.6. In other words, it is presumed that the problem of stray light occurs significantly in a case where a difference in diameter (G1/G2) of the lens 16C with respect to the lens 16B is 1.7 or more.

Modification Examples

Next, modification examples will be described.

An uneven shape has been formed on the lens facing surface 47T and the frame facing surface 47F as the light reflection-reducing structure in this embodiment, but the light reflection-reducing structure is not limited thereto. The light reflection-reducing structure may not be an uneven shape, and may be, for example, a shape that is formed of only a convex portion including a curved surface protruding toward the lens 16C (enlargement side). Even in this structure, return light is diffused and stray light is suppressed in comparison with a case where each of the lens facing surface 47T and the frame facing surface 47F is a flat surface. That is, the light reflection-reducing structure has only to be structure in which return light is diffused and stray light is suppressed in comparison with a case where the structure is not provided.

Further, an example in which not only the lens facing surface 47T but also the frame facing surface 47F has the light reflection-reducing structure has been described in this embodiment, but only the lens facing surface 47T may have the light reflection-reducing structure. The reason for this is that an effect of suppressing stray light can be expected even though measures are applied to only the lens facing surface 47T since it is thought that the amount of return light traveling toward the lens facing surface 47T is larger than the amount of return light traveling toward the frame facing surface 47F. Of course, it is preferable that the frame facing surface 47F has the light reflection-reducing structure as in this embodiment.

Further, the lens contact surface 47S is provided as an example of a second surface in this embodiment, but the second surface is not limited thereto. Examples of the second surface may include the outer peripheral surface, the contact surface 45A, and the contact surface 45B of the first holding frame 45, and may be an unmachined surface that is not subjected to machining for intentionally forming unevenness.

Furthermore, the projection lens 11 includes a bending optical system for bending an optical axis twice in the embodiment, but the projection lens 11 is not limited thereto. For example, the projection lens 11 may be adapted to bend an optical axis once or to linearly guide light without bending an optical axis.

Further, an example in which a DMD is used as the image forming panel 32 has been described in the embodiment, but a transmission type image forming panel, which uses a liquid crystal display (LCD) instead of a DMD, may be used. Alternatively, a panel using a self light-emitting element, such as a light emitting diode (LED) and/or an organic electroluminescence (EL) display, may be used. A total reflective type mirror may be used as the reflective part instead of a specular reflective type mirror.

An example in which a laser light source is used as the light source 34 has been described in the embodiment, but the disclosure is not limited thereto. A mercury lamp and/or an LED may be used as the light source 34. Further, a blue laser light source and a yellow phosphor have been used in the example, but the disclosure is not limited thereto. A green phosphor and a red phosphor may be used instead of a yellow phosphor. Furthermore, a green laser light source and a red laser light source may be used instead of a yellow phosphor.

In this specification, "A and/or B" is synonymous with "at least one of A or B". That is, "A and/or B" may mean only A, may mean only B, or may mean a combination of A and B.

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

What is claimed is:

1. A projection lens that emits incident light through a plurality of lenses, the projection lens comprising:
   a first lens that is asymmetric with respect to an optical axis and is disposed to be closest to an emission side;
   a second lens which is adjacent to the first lens and of which a diameter is smaller than a diameter of the first lens; and
   a frame that includes a first surface and is positioned outside the second lens in a radial direction,
   wherein the first surface comprises a contact surface that faces toward the emission side and contacts the second lens, and a light reflection-reducing surface that is co-planar with the contact surface and that faces the first lens with a space interposed between the light reflection-reducing surface and the first lens,
   the light reflection-reducing surface is a surface onto which a light that is transmitted by the second lens and reflected by the first lens surface of the first lens facing the first surface of the frame is incident, and has a light reflection-reducing structure, and
   a value of G1/G2 is 1.7 or more in a case where the diameter of the first lens is denoted by G1 and the diameter of the second lens is denoted by G2.

2. The projection lens according to claim 1,
   wherein the light reflection-reducing structure is an uneven shape.

3. The projection lens according to claim 2,
   wherein the frame includes a flat second surface, and
   a depth of unevenness of the first surface is larger than a depth of unevenness of the second surface.

4. The projection lens according to claim 1,
   wherein a half angle of view of the projection lens is 63° or more.

5. The projection lens according to claim 1,
   wherein the first lens is an aspherical lens and the second lens is a spherical lens.

6. The projection lens according to claim 5,
   wherein at least an incident-side lens surface of the first lens is an aspherical surface, and
   the lens surface includes both a concave surface portion and a convex surface portion.

7. The projection lens according to claim 6,
   wherein a thickness of the convex surface portion of the first lens is 2.6 to 6 times a thickness of the concave surface portion.

8. The projection lens according to claim 1, further comprising:
   a stop portion,
   wherein at least two or more lenses are provided between the first surface and the stop portion.

9. The projection lens according to claim 1, further comprising:
   a reflective mirror that reflects incident light; and
   a stop portion,
   wherein the stop portion is closer to an incident side than the reflective mirror and the first surface is closer to the emission side than the reflective mirror.

10. The projection lens according to claim 1,
    wherein the frame is made of a resin material and holds the second lens.

11. The projection lens according to claim 10,
    wherein a distal end of the frame covers a side surface of the second lens and an outer peripheral edge of a surface of the second lens.

12. The projection lens according to claim 1,
    wherein a center of an image to be projected is biased with respect to an optical axis of the second lens.

13. A projection device comprising:
the projection lens according to claim 1;
a housing on which the projection lens is mounted; and
an electro-optical element that is housed in the housing.

14. The projection lens according to claim 2,
wherein a half angle of view of the projection lens is 63° or more.

15. The projection lens according to claim 2,
wherein the first lens is an aspherical lens and the second lens is a spherical lens.

16. The projection lens according to claim 3,
wherein a half angle of view of the projection lens is 63° or more.

17. The projection lens according to claim 3,
wherein the first lens is an aspherical lens and the second lens is a spherical lens.

18. The projection lens according to claim 1, wherein
the emission side peripheral end of the second lens is located further to the emission side than the contact surface.

19. A projection lens that emits incident light through a plurality of lenses, the projection lens comprising:
a first lens that is asymmetric with respect to an optical axis and is disposed to be closest to an emission side;
a second lens which is adjacent to the first lens and of which a diameter is smaller than a diameter of the first lens; and
a frame that includes a first surface and is positioned outside the second lens in a radial direction,
wherein the first surface comprises a contact surface that faces toward the emission side and contacts the second lens, and a light reflection-reducing surface that is co-planar with the contact surface and that faces the first lens with a space interposed between the light reflection-reducing surface and the first lens,
the light reflection-reducing surface is a surface onto which a light that is transmitted by the second lens and reflected by the first lens surface of the first lens facing the first surface of the frame is incident, and has an uneven shape formed thereon, and
a value of G1/G2 is 1.7 or more in a case where the diameter of the first lens is denoted by G1 and the diameter of the second lens is denoted by G2.

20. The projection lens according to claim 19,
wherein a half angle of view of the projection lens is 63° or more.

21. The projection lens according to claim 19,
wherein the first lens is an aspherical lens and the second lens is a spherical lens.

22. The projection lens according to claim 19, wherein
the emission side peripheral end of the second lens is located further to the emission side than the contact surface.

* * * * *